Patented Feb. 16, 1943

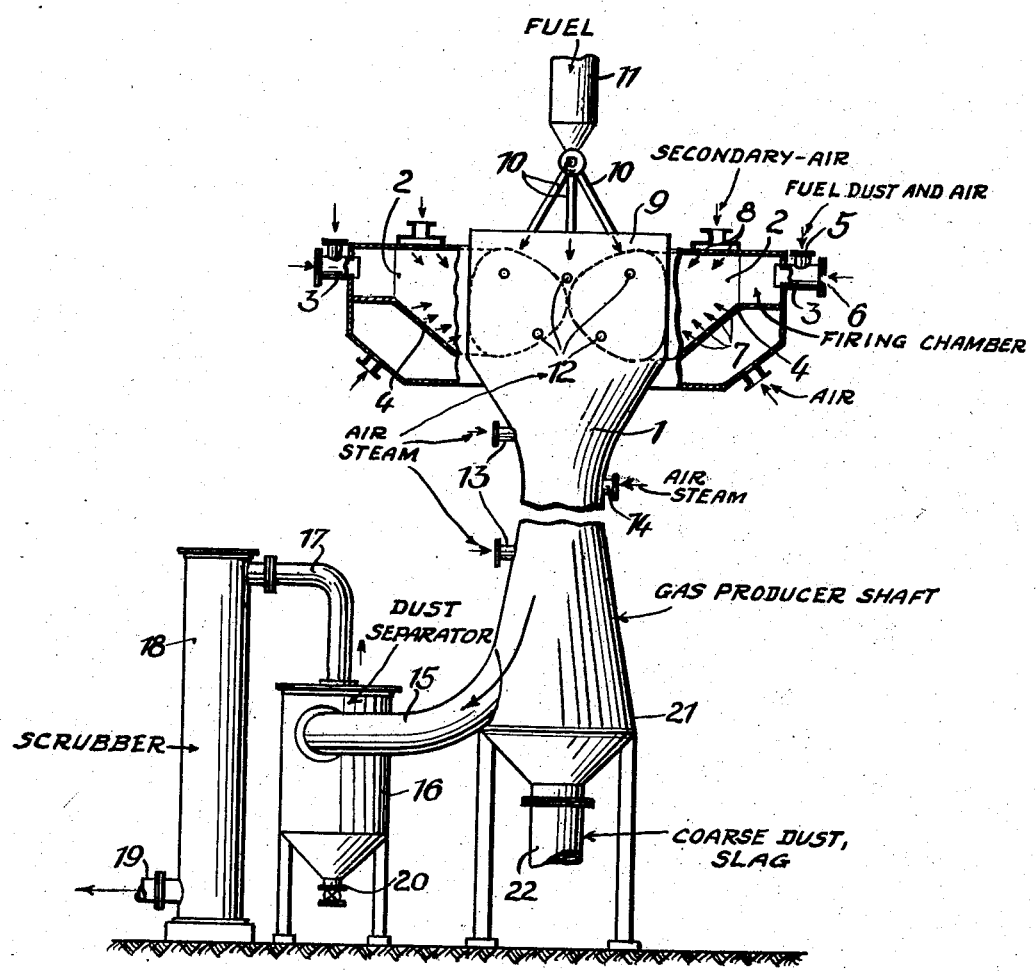

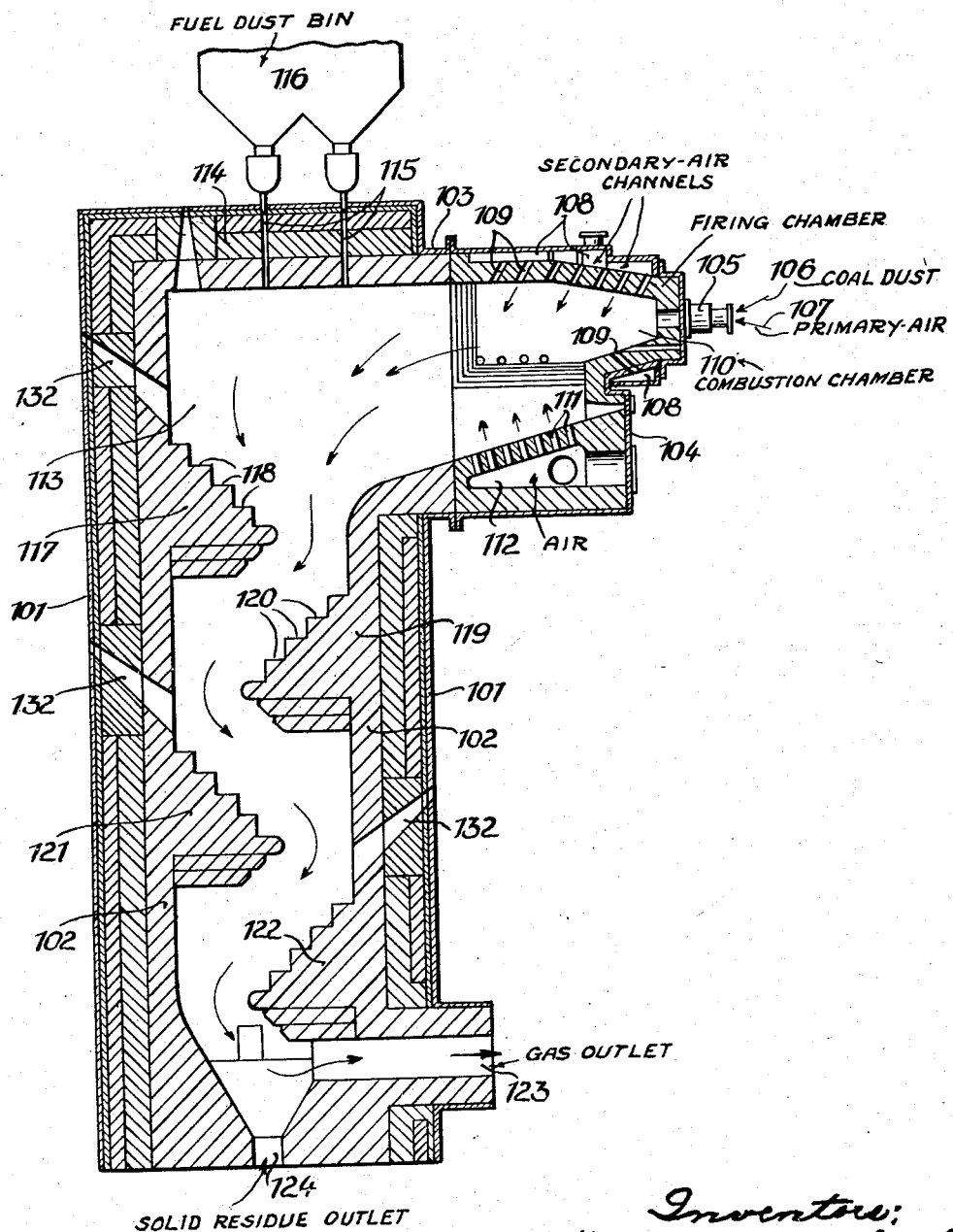

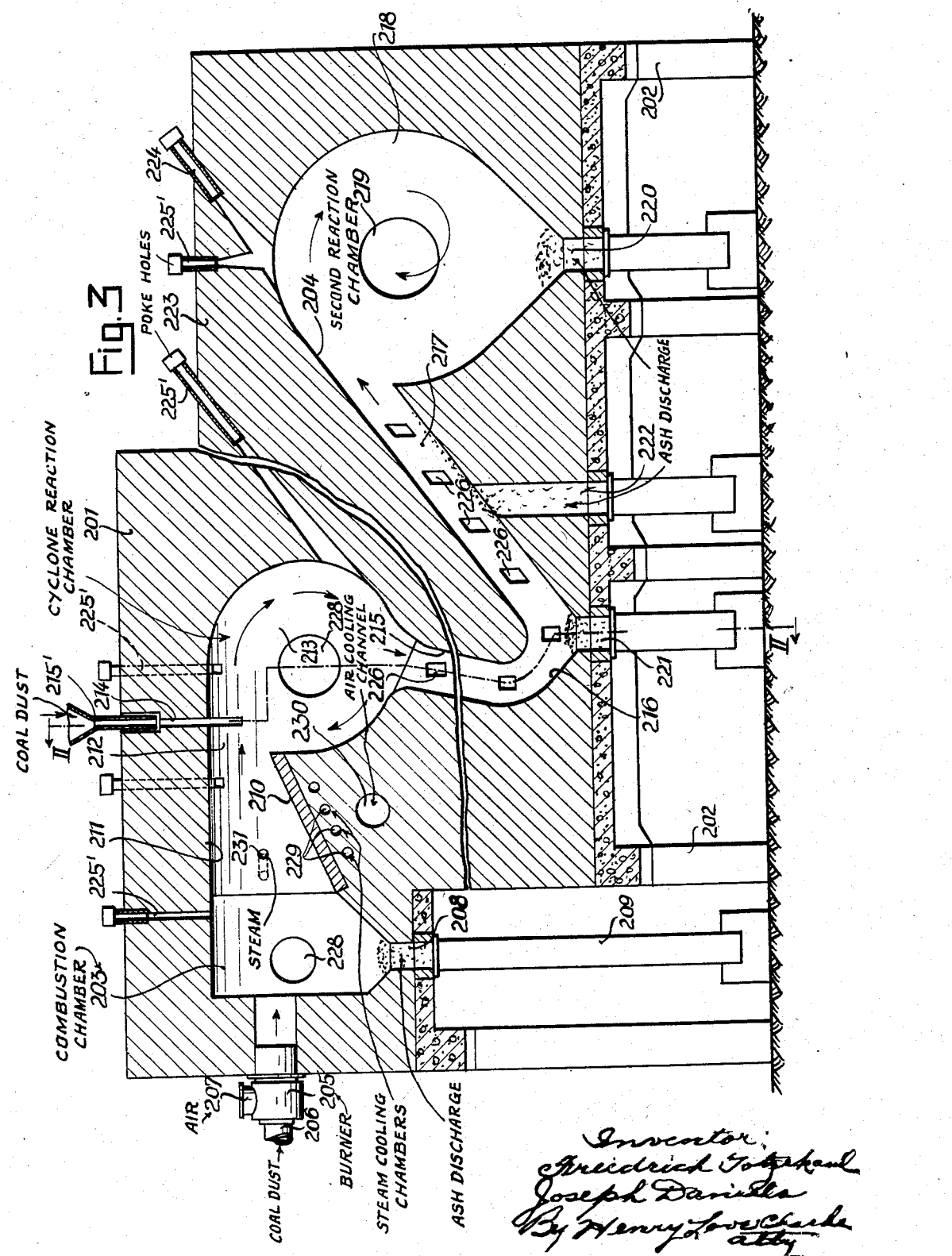

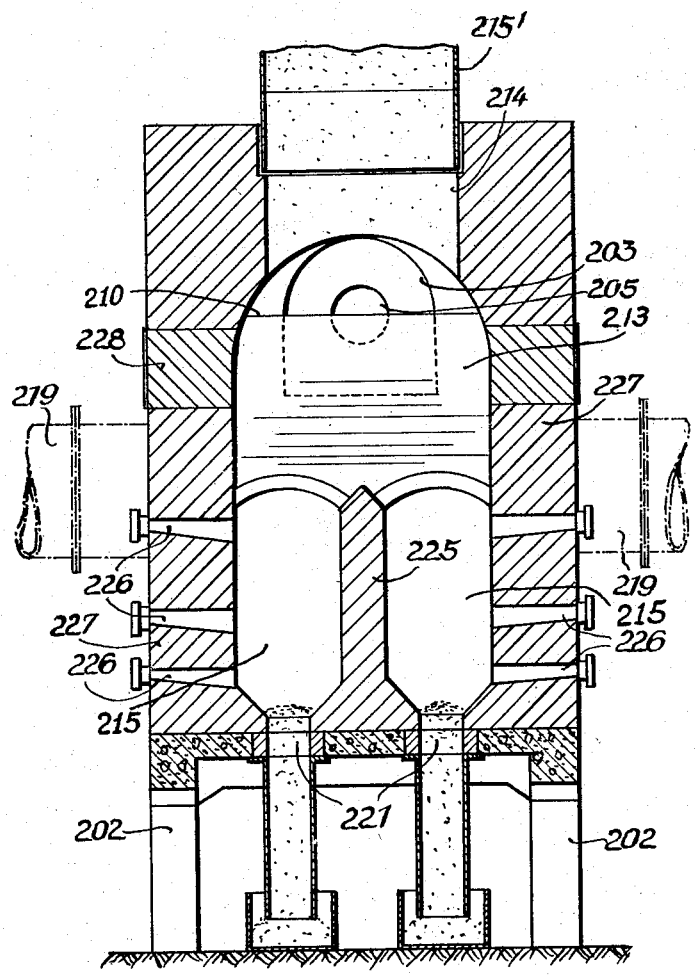

2,311,140

UNITED STATES PATENT OFFICE 2,311,140

MANUFACTURE OF PRODUCER GAS

Friedrich Totzek and Joseph Daniels, Essen, Germany, assignors, by mesne assignments, to Koppers Company, Pittsburgh, Pa., a corporation of Delaware Application April 26, 1939, Serial No. 270,076
In Germany April 28, 1938

9 Claims. (Cl. 48—73)

The present invention relates to the manufacture of valuable heating gas from finely granular or dust-like fuels.

It has been suggested to burn dusty or finely grained fuels by dust firing, that is in suspension, and to bring the hot waste gases rich in carbon dioxide into contact with other dusty or finely granular fuel, so that the carbon dioxide may be converted into carbon monoxide. According to the known proposition, the fuel is brought into contact with the hot combustion gases in a vertical shaft, the fuel passing downwards through the shaft and the hot combustion gases passing upwards countercurrent to the fuel.

The invention has for its object to improve the manufacture of valuable fuel gas from dusty or finely granular fuels in such a manner that a high yield of fuel gas of superior quality and a high efficiency of the gas producer may be obtained thus eliminating certain difficulties which were caused, until the present invention, by the caking together of the fuel ash.

The output of valuable fuel gas of the gas producer and the calorific value of the generated fuel gas increase as the temperature at which the hot combustion gases come into contact with the fuel increases. The temperature of the gases must, however, not be increased to such a degree that the ash of the fuel softens or melts.

Now, the invention principally provides for conducting the hot combustion gases which are produced by the combustion of a part of the finely grained, or pulverized fuel to be treated in co-current or parallel flow with the other part of the finely granular or pulverised fuel to be treated, downwards through a gasifying or reaction chamber, which may be formed by an essentially vertical or nearly vertical shaft.

The essential advantages of the process according to the invention resides in the fact that the fuel is quickly heated to the desired reaction temperature so that the carbon is not subject to any undue conversions reducing its reactivity, and any conversion into a graphitic modification is avoided. On the other hand, a melting of the ash in the zone of highest temperature in the gas producer is prevented as a large amount of carbon is present in elementary form. In the known processes in which the media are brought into contact with one another in countercurrent, the quantity of ash in the zone of highest temperature in the gas producer is considerable, so that the ash tends to cake together, or even melts, if the reaction temperature only varies to a small extent, which is practically unavoidable. Furthermore the fuel is heated fairly slowly with gasification in countercurrent, and in the high temperature zone of the gas producer shaft, the fuel assumes a comparatively highly reactive state. Although gasification in countercurrent should give a more favourable heat economy from a theoretical point of view, and should show the maximum utilization of carbon, since the sensible heat of the hot fuel gas can be used for preheating the fuel, practically the efficiency of the gas producer is worse and a fuel gas of a comparatively low calorific value is produced.

Another feature of our present invention consists in arranging one or several step-like, horizontal or inclined faces within the gas producer shaft. The mixture of fuel and hot gases flows along said faces on which the coarse grains of the fuel may settle down so that the large fuel grains take longer to pass through and thus have enough time to react with the hot gases.

According to the invention, an inclined downwardly leading pipe is connected with the bottom of the gas producer shaft for the withdrawal of the fuel gas. This pipe is connected according to the invention with a second reaction chamber, which is designed similar to a cyclone separator, where the reaction is finished and the fuel gas separated from the fuel ash which has been carried forward with the gas.

Finally another important feature of the present invention is the introduction of the fuel into the upper end of the gas producer shaft together with a certain quantity of steam, preferably highly superheated steam.

With the above and other objects and features of the present invention in view, we will now describe a preferred embodiment thereof on the lines of the accompanying drawings in which:

Fig. 1 shows schematically a gas producer, in a view and partly in a vertical section, constructed according to the invention, Fig. 2 is a vertical section through another type of gas producer construction embodying the invention, Fig. 3 is a vertical section through a further type of gas producer construction embodying the invention, and Fig. 4 is a vertical section on line II—II of Fig. 3.

Referring to Fig. 1 of the drawings the structure serving for carrying out the process according to the invention comprises a gas producer I having the shape of a shaft tapering outwardly towards the bottom and constructed of refractory material. At the upper end of the gas producer shaft there are provided two coal dust firing chambers 2 which are equipped with suitable burners 3 and a bottom 4 fitted with openings. The burners are supplied with fuel dust at 5 and with air preferably preheated. The fuel dust is delivered to the burners through the pipe line 6. Furthermore air is also introduced underneath the grate 4 as indicated by the arrows 7. A regulatable quantity of secondary air is introduced into the firing space 2 at the points 8. Under certain conditions steam may be added to the air.

Both coal dust firing chambers 2 terminate in the upper part of the shaft 1. To the roof 9 of the shaft 1 are connected several fuel feeding pipes 10 which are supplied with fuel from a bunker 11. The fuel is distributed over the cross section of the shaft 1 as uniformly as possible.

Openings 12, 13 and 14 are also provided in the shaft. These openings are placed at different levels along the height of the shaft and serve to introduce air and eventually steam into the gasifier. In this way, the temperature may be properly and accurately adjusted in the top of the shaft 1.

The fuel dust entering the shaft 1 through pipes 10 is set to whirling immediately by the hot gases of the coal dust firing chambers 2 which preferably terminate tangentially to the shaft. On account of the high temperature of the hot combustion gases, carbon dioxide and steam convert by a quick reaction with the finely divided fuel.

The gases then flow downwards when the reaction with the fuel finishes and finally they leave the shaft 1, through the pipe 15 which leads to the dust separator 16.

The fine fuel dust separating in the cyclone separator 16 is drawn-off through the pipe 20 and then brought back to the fuel bunker 11 at the top of the gas producer shaft.

The coarse parts of the fuel dust and the slag collect on the conical bottom 21 from where they are discharged through the pipe 22. The gas passes through the pipe line 17 to a scrubber 18 from where it is drawn off through the pipe line 19.

The gas producer illustrated in Fig. 2 is fitted with a cylindrical casing 101 which is lined with a refractory material 102. At the upper end of the casing is an extension 103 to which is connected the casing 104 of a coal dust firing chamber. The burner 105 of the coal dust firing chamber is supplied with fuel dust through the pipe line 106 and with primary air through the pipe line 107. Secondary air is distributed through the channels 108 which are in connection with the combustion chamber 110 through the openings 109. The bottom of the combustion chamber 110 is formed by an inclined grate 111 through which air is likewise introduced from a distributing chamber 112 into the combustion chamber.

During the combustion of the fuel dust from the burner 105, the coarse grains of the fuel dust fall onto the grate 111 where it is completely burnt. The hot gases then flow from the combustion chamber 110 into the upper end of the gas producer shaft 113. Fuel dust is introduced in adjustable quantities from a bunker 116 through openings 115 arranged in the roof 114 of the gas producer. The quantity of fuel dust from the bunker 116 is so calculated that the very hot gas mixture issuing from the combustion chamber 110 is reduced with the conversion of carbon dioxide into carbon monoxide.

A part of the fuel gas leaving the combustion chamber 110 is directed towards the upper side of a wall projection 117 of the gas producer shaft. The upper side of this wall projection is fitted with steps 118 as may be seen from the drawings. On the horizontal upper side of the projections a part of the coarse grains settle out of the gas current.

Fuel dust and gas then flow downwards within the gas producer shaft 113 touching a wall projection 119 which is arranged on the shaft side opposite the projection 117 in staggered relation therewith. The wall projection 119 is designed similar to the wall projection 117. On the steps 120 of the wall projection, fuel dust is likewise precipitated which at the same time protects, however, the refractory material in an advantageous manner from becoming superheated.

Beneath the wall projection 119 also the wall projections 121, 122 are arranged inside the shaft in such a manner that the fuel dust gas mixture flows through the gas producer shaft 113 in a zig-zag way. The height of the gas producer shaft is chosen so that the reaction between the fuel dust and the hot gases takes place to the desired degree. The gas is finally discharged at the lower part of the gas producer through the pipe line 123 while the residue of the fuel is removed at 124.

The wall projections 117, 119, 121, 122 reach beyond the whole width of the gas producer shaft. It is, however, possible also to make the wall projections much smaller and to arrange them in a worm-line whereby the turbulent flow of the fuel dust gas mixture within the gas producer shaft may be advantageously improved.

Fuel dust of the grain composition which is usually used for the coal dust firing chambers contains a certain quantity of coarse granular constituents the conversion of which requires a certain time interval for the reaction. If hot combustion gases are acted upon by such a fuel dust in order to reduce the carbon dioxide of the combustion gases, the coarse grains of the fuel dust will take a considerably longer period before they are completely consumed than the fine particles. On the other hand the coarse grains of the fuel dust are carried forward with the gas stream less than in the case of the fine particles.

If fuel dust of various grain size is introduced into the gas producer according to the invention, the fine particles are carried along with the hot gases while the coarse grains precipitate on the upper side of the staggered wall projections. The hot reaction gases flow along the deposited coarse fuel dust grains and gradually reduce their size to such an extent that the fuel dust grains eventually are carried forward along with the gas stream. The repeated change in direction to which the gas stream is subjected within the gas producer according to the invention causes the hot gas to flow along the coarse fuel grains which precipitate on the wall projections. A portion of the coarse grains will thereby fall gradually down the upper side of the wall projections from the top downwards. In each case the coarse grains of the fuel dust remain in the gas producer until the carbon of the fuel dust is converted even though the gas stream has a high velocity as is for instance necessary to obtain an increased yield of gas.

In order to keep the upper side of the wall projections of the gas producer shaft free from precipitations, poking holes 132 are still further provided in the gas producer shaft through which the gas producer ledges can be reached by the use of suitable poking tools.

The introduction of the fuel dust at the roof of the gas producer shaft is suitably done in such a way that a dust curtain is maintained between the very hot gas leaving the combustion chamber 113 and the refractory wall of the shaft, said curtain prevents a superheating of the refractory brickwork in the upper part of the gas producer shaft where the highest temperature exists.

The dust from the dust separator, which latter is connected with the gas outlet 123, for the removal of fuel dust or the like from the gas, may be delivered to the coal dust burner 110 for the utilization of the combustibles contained in the dust so that practically the whole carbon content of the fuel which is delivered to the gas producer is used. It is then preferable to blow the separated dust in hot condition into the coal dust firing chamber.

With the mode of carrying out the invention according to Figs. 3 and 4, the gas producer 201, built of refractory material and serving for the gasification of the pulverized or finely granular material, is erected on supports 202. The gas producer consists of the combustion chamber 203 and the reaction chamber 213. At the front wall of the combustion chamber 203, a coal dust burner 205 is installed to which combustion air is delivered through the pipe 207 and coal dust through the pipe 206. The bottom of the combustion chamber 203 is provided with a discharge opening 208 in which the ash of the burnt coal dust is accumulated and from where it is discharged through the shaft 209 from time to time. The combustion chamber 203 opens into a connecting channel 211 which is provided with an inclined bottom 210 and which joins the cyclone separator reaction chamber 213 in an essentially tangential direction as indicated on the drawings at 212.

Furthermore a coal dust feed slot 214, extending through the roof of the cyclone-like chamber 213 nearly along its whole width, terminates in the cyclone separator chamber 213. Fuel dust in finely divided form passes from a container 215' through said slot to the stream of the combustion gases reaching the cyclone separator chamber 213 through the opening 212. The fuel dust is brought into intimate contact with the hot combustion gases and mixed well in the cyclone separator chamber, the axis of which is arranged horizontally. The fuel dust together with the gasified proportions then passes downwardly into an approximately vertical channel-like shaft 215 communicating along the bottom of the cyclone separator chamber 213 for some length, which may be as necessary. The channel like shaft 215 is bent at a lower point 216 and then extends into a channel 217 leading upwards into a second reaction chamber 218 built similar to reaction chamber 213 in which the channel 217 likewise terminates tangentially into the top of same. At the horizontal axis of the cyclone separator chamber 218 horizontal fuel gas outlets 219 are provided at both sides. The reaction chamber shaft 215 is advantageously divided into two narrow sections by a central partition 225 so as to improve the reaction between the material to be treated.

The cyclone separator chamber 218 tapers towards the bottom into an ash discharge 220 in which essentially only the ash of the fine fuel dust grains carried forward with the gas is precipitated. This part of the fuel ash is practically free from any carbon. The coarse coal dust grains incompletely gasified deposit on the lowest point 216 of the channel-like shaft 215 near the discharge opening 221. Fuel grains of medium size and a grading gasified to such a size precipitate on the bottom of the inclined shaft 217. Nearly in the middle of the inclined shaft 217 on its bottom there is provided another outlet channel 222 through which the ash may be discharged as necessary.

The fuel remains inside the reaction chamber 213 and especially near the point 216 of the channel 215 for the reaction chamber and within the upwardly inclined channel 217 until the hot gases brought into contact with the fuel have gasified the carbon to the desired extent. The depositing fuel dust that remains still ungasified, or the ash accumulating on the bottom of the inclined channel 217, slides into the outlet channels 221, and 222 due to the inclination of the channel 217 being arranged at a suitable angle of inclination, whilst the mineral dust formed by the conversion of the carbon is carried along with the gases into the cyclone separator chamber 218. In the direction of the inclined shaft-like channel 217, poking and inspection holes 224 are provided in the roof of the cyclone chamber 218. Furthermore poking and inspection holes 225' are provided in the roof of the reaction chamber 213 as well as for the combustion chamber 203, so as to have the interior of the reaction and combustion chambers well accessible. Poking and inspection holes 226 provided laterally in the brickwork 227 likewise lead to the channels 215, 217. Furthermore manholes 228 are arranged in the brickwork 227.

In the inclined bottom 210 of the combustion chamber 203, there are arranged cooling channels 229 through which preferably steam is led in order to protect the brickwork from superheating caused by the high temperatures produced by the burner 205. A still larger air cooled chanel 230 is provided underneath these cooling channels 229.

Steam preferably such steam superheated in the cooling chanels 229 may be introduced into the combustion chamber 203 through an opening 231 arranged laterally in the brickwork 227 of the combustion chamber. A fuel gas containing water gas may thus be produced and simultaneously the temperature of the hot combustion gases can be regulated.

The coarse fuel grains accumulate on the lowest points of the cyclone-chambers and channels as well as partially on the inclined faces of them while the fine dust grains carried along with the hot combustion gases are completely gasified when adopting the apparatus illustrated in Figs. 3 and 4 for the purpose. The precipitated coarse dust grains arel ikewise gasified by the combustion gases passing over them. The ash is extracted through the outlets provided at the lowest points of the cyclone chambers and channels. The generated fuel gas is driven off at the end of the reaction chamber which preferably terminates into a cyclone separator chamber from where the useful gases may be drawn off through an exit 219.

When carrying out the process according to the present invention, a complete gasification even of the coarse fuel dust grains is rendered possible, the ash of which may be discharged through the outlets if necessary. By the introduction of coal dust or combustion air at the various points of the reaction chamber it is possible to reduce or increase the temperature and furthermore to regulate the reduction of carbon dioxide into carbon monoxide by means of carbon of the added fuel.

As already mentioned above, it is advantageous to introduce steam into the reaction chambers. The steam reduces with carbon at high temperatures with the formation of hydrogen and carbon monoxide. The calorific value of the fuel gas produced is thereby increased.

The steam before being introduced into the reaction chambers may be superheated as high as possible. It is advantageous to introduce the steam simultaneously with the fuel into the reaction chamber. In this way a good distribution of the fuel is attained already at the inlet and from the inlet over the whole area of the reaction chamber whereby the reaction of the fuel with the hot gases is improved.

Within the scope of the present invention, the term "fuel" means bituminous coal, coke, lignite or any other suitable solid carbonaceous fuel. The fuel is preferably reduced before being introduced into the reaction chamber so that a large quantity of fuel is transferred into dust. Under certain conditions it is also possible to burn gaseous or liquid fuels for the production of hot waste gases which are brought into contact with the solid fuel. Instead of or in addition to the coal dust firing which is illustrated on the drawings, suitable gas or oil firing means may be provided for the purpose according to the invention.

Finally it may be said that the reaction shaft of the apparatus carried out according to the present invention may be subdivided by vertical partitions into several compartments open at the top and at the bottom. These partitions preferably reach from the upper enlarged part of the shaft to which joins the firing chamber. The top of the partitions is advantageously knife-like so that the fuel dust cannot precipitate on the end faces of the partitions.

Especially when dividing up the reaction shaft as described above it is advantageous to provide a multitude of openings in the roof of the reaction chamber for the introduction of fuel so that the fuel is uniformly distributed over the cross section of the reaction shaft and the vertical compartments respectively formed therein.

The fuel inlet openings are preferably arranged in such a manner that a separate regulatable fuel supply is rendered posible for each compartment of the reaction shaft.

Under certain conditions it is advantageous to install guide walls in the free space above the partitions provided in the reaction chamber, said guide walls extending in the direction of the gases coming from the firing. Thereby the hot waste gases of the firing are distributed equally over the cross section of the shaft. These vertical guide walls may also be used for the introduction of the fuel directly into each of the shaft compartments which are formed by the vertical partitions.

We have now above described our present invention on the lines of a preferred embodiment thereof but our invention is not limited in all its aspects to the mode of carrying it out as described and shown since the invention may be variously embodied within the scope of the following claims.

What we claim is:

1. Apparatus for the production of valuable fuel gas from finely grained or dusty fuels comprising a reaction chamber having essentially the shape of a vertical shaft; a firing chamber separate from the reaction chamber, said firing chamber having burner means for burning primary air and fuel and secondary combustion air-supply means for secondary combustion of the gases of combustion, and said firing chamber communicating with the reaction chamber to deliver the combustion gases to the reaction chamber at its upper part; means for offtake of reaction gas at a lower part of the reaction chamber; and means for feeding finely grained dusty fuel to the reaction chamber, said latter means being arranged to deliver the fuel directly into the gas issuing from the firing chamber as it enters the upper part of the reaction chamber, for co-current flow of the gas and fuel through the reaction chamber to its gas outlet, and in which the reaction chamber is of enlarged area adjacent the firing chamber and gradually decreases in area from the enlarged area towards the vertical middle section of the shaft, and then continues on towards the lower gas outlet and is gradually widened in area from the vertical middle section of the shaft to the lower gas outlet, and in which the gas outlet is constituted of a downwardly and outwardly inclined conduit, and in which the outlet is communicably connected with a fine dust separator, and the lower end of the reaction chamber below the gas outlet constitutes a receiver for the coarse dust.

2. Apparatus for the production of valuable fuel gas from finely grained or dusty fuels comprising: a reaction chamber; a firing chamber separate from the reaction chamber having burner means for burning primary air and fuel and secondary combustion air supply means for secondary combustion of the combustion gases; said reaction chamber being constituted of a cylindrical chamber having walls curved around a horizontal axis, and said firing chamber communicating with the reaction chamber tangentially at the upper parts thereof; means for feeding the dust-like fuel to the combustion gases issuing from the firing chamber as they enter the reaction chamber; and means for withdrawing the reaction gases from the reaction chamber comprising a downwardly directed duct means leading off from the curved walls at the lower part of the reaction chamber, and which includes a secondary cylindrical reaction chamber having walls curved around a horizontal axis; said secondary reaction chamber communicating with the lower part of the downwardly directed duct means through an upwardly inclined channel terminating tangentially of the curved walls of the secondary reaction chamber; and a gas offtake from the secondary reaction chamber at the horizontal axis thereof.

3. Apparatus for the production of valuable fuel gas from finely grained or dusty fuels comprising: a reaction chamber having essentially the shape of a vertical shaft; a firing chamber to one side of the reaction chamber and at the upper part thereof and communicating with the reaction chamber at its upper part to deliver the combustion gases to the reaction chamber at its upper part, said firing chamber having burner means for burning primary air and fuel and secondary combustion air-supply means for secondary combustion of the gases of combustion; means for offtake of reaction gas at a lower part of the reaction chamber; and means directly over the reaction chamber for feeding finely grained dusty fuel directly downwardly into the same at its upper part so as to flow co-currently with the gas downwardly through the reaction chamber, said latter means being arranged to deliver the fuel into the gas issuing from the firing chamber that the path of flow of the finely grained fuel is out of paths of flow leading to the firing chamber and entirely in path flow leading into the reaction chamber, and thus avoid counter-current flow with the gas in the act of issuing from the firing chamber.

4. Apparatus as claimed in claim 3 and in which horizontal baffles are arranged in staggered relationship inside the reaction chamber to retain coarse dust on the baffles and cause an angular course of flow of the gas over the same.

5. Apparatus for the production of valuable fuel gas from finely grained or dusty fuels comprising: a reaction chamber; a firing chamber separate from the reaction chamber having burner means for burning primary air and fuel and secondary combustion air supply means for secondary combustion of the combustion gases; said reaction chamber being constituted of a cylindrical chamber having its axis horizontal and walls curved around the horizontal axis, and said firing chamber communicating with the reaction chamber tangentially at the upper parts thereof to discharge the combustion gases circumferentially into the reaction chamber; means for feeding the dust-like fuel into the combustion gases issuing from the firing chamber where they tangentially enter the reaction chamber; and means for withdrawing the reaction gases from the reaction chamber comprising a downwardly directed duct means leading off from the curved walls at the lower part of the reaction chamber, the means for feeding the dust-like fuel to the combustion gases being arranged to deliver all of it thereto so as to both avoid counter-current flow therewith and cause the two to flow co-currently away from the firing chamber.

6. Apparatus for the production of valuable fuel gas from finely grained or dusty fuels comprising: a reaction chamber having essentially the shape of a vertical shaft; two firing chambers separate from the reaction chamber at the upper part thereof and communicating with the reaction chamber at its upper part to deliver the combustion gases to the reaction chamber at its upper part, each of said firing chambers having burner means for burning primary air and fuel and secondary combustion of the gases of combustion; means for offtake of reaction gas at a lower part of the reaction chamber; and means for feeding finely grained dusty fuel to the reaction chamber at its upper so as to flow co-currently with the gas downwardly through the reaction chamber, said latter means being arranged to deliver the fuel into the gas issuing from the firing chamber so as to avoid counter-current flow of the gas and added fuel from the delivery of the fuel to the reaction chamber gas outlet, said firing chambers being disposed opposite each other on opposite sides of the upper inlet to the reaction chamber so that the gases from the two firing chambers meet and oppose each other causing turbulence, and whirl the fuel as it is fed thereto by the feed means therefor.

7. In a process for the production of valuable fuel gas from finely grained or dusty fuels which process comprises treating the fuel to be gasified with hot combustion gases in a reaction chamber; the improvement comprising: generating hot combustion gases rich in $CO_2$ in a firing zone to one side of the reaction chamber; then flowing the gases rich in $CO_2$ through the reaction chamber; introducing the fuel to be gasified initially into the hot combustion gases issuing from the firing chamber directly over the reaction chamber where the gases enter the reaction chamber and so that the path of flow of all of the added fuel is out of paths of flow leading to the firing chamber and entirely in path flow leading to the reaction chamber, causing the so introduced fuel to flow along with the gases through the reaction chamber in co-current flow from near the entrance end to the gas offtake outlet from the reaction chamber; and withdrawing the reaction products at the outlet; the supply of the fuel to be gasified to the hot combustion gases as they enter the reaction being effected so as to avoid entrance of any substantial amount of the fuel to be gasified into the firing zone during generation of the gas rich in $CO_2$.

8. Apparatus for the production of valuable fuel gas from finely grained or dusty fuels which comprises: a reaction chamber having a gas inlet and a gas outlet; a firing chamber to one side of the top of the reaction chamber adapted to generate combustion gases rich in $CO_2$; said firing chamber communicating with the inlet to the reaction chamber to deliver its combustion gases thereto; means for feeding finely grained dusty fuel to the combustion gases; said means being arranged to deliver the fuel into initial contact with the combustion gas issuing from the firing chamber, directly over the reaction chamber where the gases enter the reaction chamber; outlet means for drawing off the reaction gases from the reaction chamber, said outlet means for drawing off reaction gas and said firing chamber and said means for supplying fuel being arranged relative to each other and to the reaction chamber as to cause the path of flow of all of the added fuel to flow out of paths of flow leading to the firing chamber and entirely in path flow leading to the reaction chamber, for flow with the gas from the firing chamber entirely in co-current flow together through the reaction chamber, and said means for feeding fuel being so arranged to supply the same to the hot combustion gas as they enter the reaction chamber as to avoid any substantial amount of flow of the added fuel into the firing chamber during generation of combustion gases rich in $CO_2$ therein.

9. Apparatus for the production of valuable fuel gas from finely grained or dusty fuels comprising: a reaction chamber having essentially the shape of a vertical shaft; two firing chambers separate from the reaction chamber at the upper part thereof and communicating with the reaction chamber at its upper part to deliver the combustion gases to the reaction chamber at its upper part, each of said firing chambers having burner means for burning primary air and fuel and secondary combustion of the gases of combustion; means for offtake of reaction gas at a lower part of the reaction chamber; and means for feeding finely grained dusty fuel to the reaction chamber at its upper part so as to flow co-currently with the gas downwardly through the reaction chamber, said latter means being arranged to deliver the fuel into the gas issuing from the firing chamber so as to avoid counter-current flow of the gas and added fuel from the delivery of the fuel to the reaction chamber gas outlet, said reaction chamber being of enlarged area at its upper part adjacent the firing chambers and gradually decreasing in area from the enlarged area towards the vertical middle section of the shaft, and then continuing on towards the lower gas outlet and being gradually widened in area from the vertical middle section of the shaft to the lower gas oulet, and said firing chambers being disposed opposite each other on opposite sides of the upper inlet to the reaction chamber so that the gases from the two firing chambers meet and oppose each other causing turbulence, and whirl the fuel as it is fed thereto by the feed means therefor.

FRIEDRICH TOTZEK.
JOSEPH DANIELS.